United States Patent
Kitada et al.

(10) Patent No.: US 9,227,422 B2
(45) Date of Patent: Jan. 5, 2016

(54) INK JET RECORDING METHOD

(71) Applicant: Seiko Epson Corporation, Tokyo (JP)

(72) Inventors: Kenji Kitada, Matsumoto (JP); Shinichi Kato, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/708,556

(22) Filed: May 11, 2015

(65) Prior Publication Data

US 2015/0328900 A1 Nov. 19, 2015

(30) Foreign Application Priority Data

May 13, 2014 (JP) ................................. 2014-099326

(51) Int. Cl.

| | |
|---|---|
| *G01D 11/00* | (2006.01) |
| *B41J 29/38* | (2006.01) |
| *B41J 2/21* | (2006.01) |
| *C09D 11/30* | (2014.01) |
| *C09D 11/101* | (2014.01) |
| *C09D 11/322* | (2014.01) |

(52) U.S. Cl.
CPC ................ *B41J 2/21* (2013.01); *C09D 11/101* (2013.01); *C09D 11/30* (2013.01); *C09D 11/322* (2013.01)

(58) Field of Classification Search
CPC ...... C09D 11/322; C09D 11/30; C09D 11/40; B41J 2/2107; B41J 2/2114
USPC ............ 347/6, 21, 95, 100; 106/31.13, 31.27, 106/31.6
See application file for complete search history.

(56) References Cited

U.S. PATENT DOCUMENTS

| | | | | |
|---|---|---|---|---|
| 7,284,851 | B2 * | 10/2007 | Bannai | B41J 2/14274 106/31.13 |
| 7,812,068 | B2 * | 10/2010 | Habashi | C09D 11/322 106/31.6 |
| 8,192,009 | B2 * | 6/2012 | Yokohama | C09D 11/322 106/31.13 |
| 2003/0107632 | A1 | 6/2003 | Arita et al. | |
| 2005/0203210 | A1 | 9/2005 | Kataoka et al. | |
| 2005/0231575 | A1 | 10/2005 | Bannai et al. | |
| 2008/0138519 | A1 | 6/2008 | Habashi et al. | |
| 2011/0181675 | A1 | 7/2011 | Takemoto | |
| 2013/0258017 | A1 | 10/2013 | Kagose et al. | |

FOREIGN PATENT DOCUMENTS

| | | |
|---|---|---|
| JP | 2003-096360 A | 4/2003 |
| JP | 2003-313470 A | 11/2003 |

(Continued)

*Primary Examiner* — An Do
(74) *Attorney, Agent, or Firm* — Harness, Dickey & Pierce, P.L.C.

(57) ABSTRACT

An ink jet recording method including recording an image on the recording medium by causing a first recording head that ejects the first ink composition and a second recording head that ejects the second ink composition to eject the first ink composition and the second ink composition while relative positions thereof with respect to the recording medium are changed, in which, in the recording of the image, a time after the first ink composition is ejected to a predetermined area of the recording medium and before the second ink composition is ejected to the predetermined area is in the range of 10 ms to 2,000 ms, a viscosity of the ink composition at 20° C. when the first ink composition is ejected is 15 mPa·s or less, and the viscosity at 20° C. when 50% of a volatile component contained in the first ink composition is volatilized is 100 mPa·s or greater.

11 Claims, 4 Drawing Sheets

(56) References Cited

FOREIGN PATENT DOCUMENTS

| | | |
|---|---|---|
| JP | 2004-043518 A | 2/2004 |
| JP | 2004-090512 A | 3/2004 |
| JP | 2006-016412 A | 1/2006 |
| JP | 2006-077232 A | 3/2006 |
| JP | 2007-291399 A | 11/2007 |
| JP | 2011-173405 A | 9/2011 |
| JP | 4794830 B2 | 10/2011 |
| JP | 2013-202928 A | 10/2013 |

* cited by examiner

INK JET RECORDING METHOD

BACKGROUND

1. Technical Field

The present invention relates to an ink jet recording method.

2. Related Art

In the related art, there has been known an ink jet recording method of recording an image or a text with a fine ink droplet ejected from a nozzle of a recording head of an ink jet recording apparatus. Among ink compositions used in such an ink jet recording method, a so-called aqueous ink composition containing a coloring material (pigment, dye, or the like), a surfactant, water, an organic solvent, or the like is widely used (see JP-A-2004-090512, JP-A-2004-043518, JP-A-2003-096360, JP-A-2006-016412, Japanese Patent No. 4794830, JP-A-2006-077232, JP-A-2003-313470, JPA-2013-202928, and JP-A-2011-173405).

Particularly, JP-A-2004-090512, JP-A-2004-043518, and JP-A-2003-096360 disclose causing a viscosity of aqueous ink to be in a predetermined range. In this manner, there has been known a method of improving the quality of an obtainable image by appropriately adjusting an initial viscosity of aqueous ink.

In addition, JP-A-2006-016412, Japanese Patent No. 4794830, JP-A-2006-077232, and JP-A-2003-313470 disclose using ink of which a viscosity becomes a desired value after moisture is evaporated. In this manner, it has been known that, if aqueous ink of which a viscosity becomes a predetermined value after being dried is used, the quality of an image can be improved or ejection stability of the ink can be improved.

Further, JP-A-2013-202928 and JP-A-2011-173405 disclose a technique of improving ejection stability of ink or suppressing color bleeding at the time of high speed printing by evaporating a solvent contained in ink after an aqueous photocuring ink composition is attached to a recording medium and before ink is cured by light irradiation.

When an image is formed on a recording medium by using the ink jet recording method, two or more kinds of ink having different coloring materials are ejected so that a droplet of the ink comes into contact with the recording medium. In this case, depending on ejection timing of the two or more kinds of ink having different coloring materials (that is, timing for causing both kinds of ink to come into contact with the recording medium), both kinds of ink are mixed with each other too much so that aggregation unevenness is generated.

Ejection timing of two or more kinds of ink having different coloring materials is not particularly regulated in JP-A-2004-090512, JP-A-2004-043518, JP-A-2003-096360, JP-A-2006-016412, Japanese Patent No. 4794830, JP-A-2006-077232, JP-A-2003-313470, JP-A-2013-202928, and JP-A-2011-173405, and when an image is recorded by using two or more kinds of ink having different coloring materials, the generation of the aggregation unevenness may not be sufficiently suppressed.

Meanwhile, aggregation unevenness generated between different colors can be suppressed to a certain extent by causing recording speed of image to decrease. However, in this case, there is problem in that recording speed of image decreases.

SUMMARY

An advantage of some aspects of the invention is to provide an ink jet recording method that can record an image in which the aggregation unevenness is suppressed at high speed and that has excellent ejection stability.

The invention can be realized in the following forms or application examples.

APPLICATION EXAMPLE 1

According to an aspect of the invention, there is provided an ink jet recording method of recording an image by using at least a first ink composition containing water, a surfactant, and a first coloring material and a second ink composition containing a second coloring material different from the first coloring material on a recording medium, the method including: recording an image on the recording medium by causing a first recording head that ejects the first ink composition and a second recording head that ejects the second ink composition to eject the first ink composition and the second ink composition while relative positions thereof with respect to the recording medium are changed, in the recording of the image, a time after the first ink composition is ejected to a predetermined area of the recording medium and before the second ink composition is ejected to the predetermined area is in the range of 10 ms to 2,000 ms, a viscosity of the ink composition at 20° C. when the first ink composition is ejected is 15 mPa·s or less, and the viscosity at 20° C. when 50% of a volatile component contained in the first ink composition is volatilized is 100 mPa·s or greater.

APPLICATION EXAMPLE 2

In the ink jet recording method according to Application Example 1, when the second ink composition is ejected to the predetermined area, a volatile component contained in the first ink composition attached to the predetermined area may be volatilized by 50% or more of the volatile component originally contained in the first ink composition.

APPLICATION EXAMPLE 3

In the ink jet recording method according to Application Example 1 or 2, a content of the surfactant contained in the first ink composition may be 0.5% by mass or greater with respect to a total mass of the first ink composition.

APPLICATION EXAMPLE 4

In the ink jet recording method according to any one of Application Examples 1 to 3, the first ink composition may contain at least one of a resin emulsion and a polymerizable compound, and a content of the resin emulsion and the polymerizable compound when converted into a solid content may be in a range of 2% by mass to 25% by mass with respect to a total mass of the first ink composition.

APPLICATION EXAMPLE 5

In the ink jet recording method according to any one of Application Examples 1 to or 4, a content of a non-volatile component contained in the first ink composition may be in a range of 3% by mass to 40% by mass with respect to a total mass of the first ink composition.

APPLICATION EXAMPLE 6

In the ink jet recording method according to any one of Application Examples 1 to or 5, a content of water contained in the first ink composition may be 50% by mass or greater with respect to a total mass of the first ink composition.

APPLICATION EXAMPLE 7

In the ink jet recording method according to any one of Application Examples 1 to or 6, the first ink composition may be an ultraviolet light curing ink composition containing a polymerizable compound, and the ink jet recording method may include irradiating the first ink composition with ultraviolet light in order to cure the first ink composition.

APPLICATION EXAMPLE 8

In the ink jet recording method according to any one of Application Examples 1 to or 7, the recording of the image may be performed by performing the irradiation a plurality of times.

APPLICATION EXAMPLE 9

In the ink jet recording method according to any one of Application Examples 1 to or 7, the recording of the image may be performed by performing the irradiation one time.

APPLICATION EXAMPLE 10

In the ink jet recording method according to any one of Application Examples 1 to or 9, the recording of the image may include heating of the recording medium between the ejection of the first ink composition and the ejection of the second ink composition.

APPLICATION EXAMPLE 11

In the ink jet recording method according to any one of Application Examples 1 to or 10, the first recording head may include a first nozzle group block and a second nozzle group block, and the first nozzle group block and the second nozzle group block may be different from each other in position in a scanning direction and different from each other in position in a direction intersecting to the scanning direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
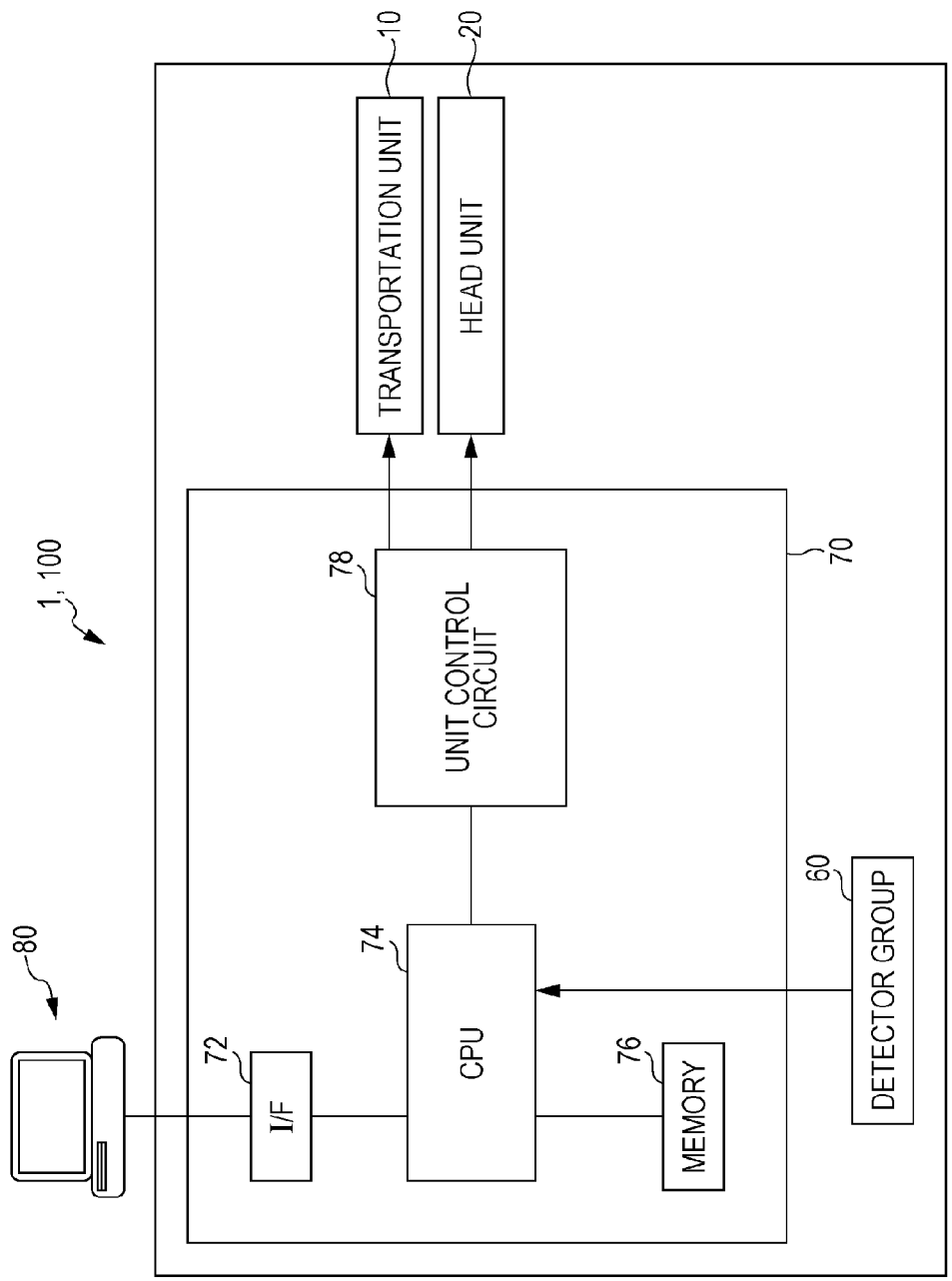
FIG. 1 is a block diagram illustrating a configuration of an ink jet recording apparatus that can be used in an ink jet recording method according to an embodiment.

Hereinafter, some embodiments of the invention are described. The embodiments described below are provided to describe an example of the invention. The invention is not limited to the following embodiments, and includes various modifications that are performed within a scope without changing from the gist of the invention. In addition, it is not considered that all of the configurations described below are essential.

An "image" in the invention refers to a pattern formed with a dot group, and the pattern includes a printing pattern, a pattern such as a picture or a diagram, and a solid pattern.

An ink jet recording method according to an aspect of the invention is recording an image by at least using a first ink composition containing water, a surfactant, and a first coloring material and a second ink composition containing a second coloring material different from the first coloring material on a recording medium. Particularly, the method includes recording an image on the recording medium by causing a first recording head that ejects the first ink composition and a second recording head that ejects the second ink composition to eject the first ink composition and the second ink composition while relative positions thereof with respect to the recording medium are changed. In addition, in the recording of the image, a time after the first ink composition is ejected to a predetermined area of the recording medium and before the second ink composition is ejected to the predetermined area is in the range of 10 ms to 2,000 ms. Further, a viscosity of the ink composition at 20° C. when the first ink composition is ejected is 15 mPa·s or less, and the viscosity at 20° C. when 50% of a volatile component contained in the first ink composition is volatilized is 100 mPa·s or greater.

Hereinafter, with respect to the ink jet recording method according to the embodiment, the ink composition used in the method and the recording method are described in sequence.

1. Ink Composition

The ink jet recording method according to the embodiment uses at least a first ink composition and a second ink composition. In the embodiment, when a simple expression of "ink composition" refers to both of the first ink composition and the second ink composition. In addition, in the following description, an ink jet recording method using two kinds of ink compositions: the first ink composition and the second ink composition is described, but the ink jet recording method according to the embodiment may use another ink composition in addition to these ink compositions.

1.1. First Ink Composition
First Coloring Material

The first ink composition according to the embodiment contains a first coloring material. Examples of the first coloring material include a dye and a pigment. As the dye and the pigment, dyes or pigments disclosed in U.S. Patent Application No. 2010/0086690, U.S. Patent Application No. 2005/0235870, and International Publication No. 2011/027842 can be preferably used. Among a dye and a pigment, a pigment is preferably contained. The pigment is preferably an organic pigment in view of preservation stability such as light resistance, weather resistance, and gas resistance.

Specifically, as the pigment, an azo pigment such as an insoluble azo pigment, a condensed azo pigment, an azo lake, and a chelate azo pigment, a polycyclic pigment such as a phthalocyanine pigment, perylene and perinone pigments, an anthraquinone pigment, a quinacridone pigment, a dioxane pigment, a thioindigo pigment, an isoindolinone pigment, and a quinophthalone pigment, dye chelate, a lake pigment, a nitro pigment, a nitroso pigment, aniline black, a daylight fluorescent pigment, carbon black, and the like are used. The pigments may be used singly, or two or more types thereof may be used in combination.

In addition, as the dye, for example, various kinds of ink commonly used in ink jet recording such as a direct dye, an acidic dye, an edible dye, a basic dye, a reactive dye, a disperse dye, a vat dye, a soluble vat dye, and a reactive disperse dye can be used.

The content of the first coloring material is preferably in the range of 1% by mass to 20% by mass and more preferably in the range of 1% by mass to 15% by mass, with respect to the total mass of the first ink composition.

When a pigment is used as the first coloring material, the pigment is preferably caused to be stably dispersed and maintained in water so that the pigment is applied to the ink composition. Examples of the method include a method of dispersing a pigment in a resin dispersant such as a water soluble resin and/or a water dispersible resin (hereinafter, pigment treated by this method is referred to as "resin dispersed pigment"), a method of dispersing a pigment in a dispersant (hereinafter, pigment treated by this method is referred to as "dispersant dispersed pigment"), and a method of chemically and physically introducing a hydrophilic functional group to the surface of a pigment particle and enabling the pigment to be dispersed and/or dissolved in water without the resin and dispersant described above (hereinafter, pigment treated by this method is referred to as "surface treated pigment").

As the first ink composition, all of the resin dispersed pigment, the dispersant dispersed pigment, and the surface treated pigment can be used, and plural kinds of pigments can be used in mixture, but the first ink composition preferably contains a resin dispersed pigment.

Surfactant

The first ink composition contains a surfactant. The surfactant has a function of decreasing the surface tension and improving wettability to a recording medium. Among the surfactants, for example, an acetyl glycol-based surfactant, a silicone-based surfactant, and a fluorine-based surfactant can be preferably used.

The acetyl glycol-based surfactant is not particularly limited, and examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (product names, manufactured by Air Products and Chemicals. Inc.), and Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (product names, manufactured by Nissin Chemical Co., Ltd.), Acetylenol E00, E00P, E40, and E100 (product names, manufactured by Kawaken Fine Chemicals Co., Ltd.).

The silicone-based surfactant is not particularly limited, and an example thereof includes a polysiloxane-based compound. The polysiloxane-based compound is not particularly limited, and an example thereof includes a polyether-modified organosiloxane. Examples of commercially available products of the polyether-modified organosiloxane include BYK-306, BYK-307, BYK-333, BYK-341, BYK-345, BYK-346, and BYK-348 (product names, manufactured by BYK Corporation), and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, manufactured by Shin-Etsu Chemical Co., Ltd.).

As a fluorine-based surfactant, a fluorine-modified polymer is preferably used, and a specific example thereof includes BYK-340 (manufactured by BYK Japan K.K.).

The content of the surfactant is preferably 0.1% by mass or greater, and more preferably 0.5% by mass or greater with respect to the total mass of the first ink composition. In addition, the upper limit thereof is preferably 2% by mass or less, and more preferably 1% by mass or less. If the upper limit is 0.5% by mass or greater, the wetting and spreading properties of the first ink composition onto a recording medium are improved so that the volatilization of a volatile component (described below) contained in the ink composition easily progresses. As a result, the mixture of the first ink composition and the second ink composition attached to a recording medium is suppressed so that the generation of the aggregation unevenness is easily suppressed.

Water

The first ink composition contains water. Water is a main medium of the first ink composition, and is a component that evaporates and scatters by drying. Water is preferably pure water such as ion-exchanged water, ultrafiltrated water, reverse osmotic water, and distilled water, or water from which ionic impurities are removed such as hyperpure water. In addition, the use of water sterilized by the irradiation of ultraviolet light or the addition of hydrogen peroxide is suitable in that the generation of fungi and bacteria can be suppressed when the ink is preserved for a long time.

The content of water contained in the first ink composition is preferably 50% by mass or greater, and more preferably 60% by mass or greater with respect to the total mass of the first ink composition. If the content of water is 50% by mass or greater, an initial viscosity of the first ink composition can be set to be in a proper range so that the ejection stability of ink becomes satisfactory.

Resin Emulsion

The first ink composition preferably contains at least one of a resin emulsion and a polymerizable compound (described below). Among the components, the resin emulsion has a function of forming a coating film and improving fixability and friction resistance of a recorded image. In addition, the resin emulsion is not a polymerizable compound (described below).

The resin emulsion is not particularly limited, and examples thereof include a product obtained by emulsifying raw materials such an acrylic resin, a styrene acrylic resin, a fluorene-based resin, a urethane-based resin, a polyolefin-based resin, a rosin-modified resin, a terpene-based resin, a polyester-based resin, a polyamino-based resin, an epoxy-based resin, a vinyl chloride-based resin, and a vinyl acetate-based resin by well-known means. The resin emulsions may be used singly, or two or more types thereof may be used in combination.

The content of the resin emulsion and the polymerizable compound when converted into a solid content is preferably in the range of 2% by mass to 25% by mass, and more preferably in the range of 5% by mass to 25% by mass with respect to the total mass of the first ink composition. In addition, both of the resin emulsion and the polymerizable compound are contained in the first ink composition, the content indicates a total value of both ink compositions, and when only one of both ink compositions is contained, the content indicates a content of the component. If the content is 2% by mass or greater, a viscosity of the ink when a portion of a volatile component (described below) contained in the first ink composition is volatilized can be easily caused to increase (be thickened) to a satisfactory value. If the content is 25% by mass or less, a viscosity of the ink when a portion of a volatile component contained in the first ink composition is volatilized can be suppressed from excessively increasing.

Polymerizable Compound

As described above, the first ink composition preferably contains at least one of the resin emulsion and the polymerizable compound. Among the components, the polymerizable compound is polymerized by being irradiated with the ultraviolet light and the recorded image can be cured by the polymerization of the polymerizable compound. The first ink composition contained in the polymerizable compound is a so-called "ultraviolet light curing ink composition".

If the first ink composition is an ultraviolet light curing ink composition, the thickening of the first ink composition can be promoted by being irradiated with the ultraviolet light as described below, and thus the generation of the aggregation unevenness caused by the mixture of the first ink composition and the second ink composition attached to a recording medium can be easily suppressed.

As the polymerizable compound, a polymerizable compound that is soluble in water can be used, and a well-known polymerizable monomer, a polymerizable resin, and a polymerizable oligomer can be used. Specific examples of the polymerizable compound include 2-ethylhexyl-diglycol (meth)acrylate, 2-hydroxybutyl(meth)acrylate, ethoxy diethylene glycol(meth)acrylate, methoxy diethylene glycol (meth)acrylate, methoxy polyethylene glycol(meth)acrylate, methoxy propylene glycol(meth)acrylate, 2-hydroxyethyl (meth)acrylate, 2-hydroxypropyl(meth)acrylate, 4-hydroxybutyl(meth)acrylate, triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, bisphenol A-ethylene oxide (EO) adduct di(meth)acrylate, bisphenol A-propylene oxide (PO) adduct di(meth)acrylate, hydroxypivalic acid neopentyl glycol di(meth)acrylate, polytetramethylene glycol di(meth)acrylate, ethylene oxide-modified trimethylolpropane tri(meth)acrylate, propylene oxide-modified trimethylolpropane tri(meth)acrylate, glycerol tri(meth)acrylate, glycerin ethoxy tri(meth)acrylate, glycerin propoxy tri(meth)acrylate, and urethane(meth)acrylate. In addition, in the specification, the expression "soluble in water" means a characteristic in which a dissolved amount in 100 g of water at 20° C. is 1 g or greater. In addition, the expression "(meth)acrylate" means both acrylate and methacrylate. In addition, a water dispersible polymerizable compound which is dispersed in water in a form such as an emulsion form or a dispersion form can be used. In this case, such a dispersible polymerizable compound is preferable in view of excellent curing properties of the ink composition. As the water dispersible polymerizable compound, with respect to the polymerizable monomer, the polymerizable resin, the polymerizable oligomer, or the like described above, a component, which is not soluble in water since the component has a portion of a hydrophobic-group in a molecule or a percentage of a hydrophobic group in a molecule is high, is dispersed by using an emulsifier or dispersed in a self-dispersion form can be included. Meanwhile, as the polymerizable compound which is soluble in water described above, a component which has a hydrophilic group in a molecule or in which a percentage of a hydrophilic group in a molecule is high can be included.

The content when the polymerizable compound is contained is as described in the item of the resin emulsion, and thus the description thereof is omitted.

Photopolymerization Initiator

The ink composition according to the embodiment may contain a photopolymerization initiator. The photopolymerization initiator is not particularly limited, as long as the photopolymerization initiator generates an active species such as a radical or a cation by being irradiated with the ultraviolet light and initiates a polymerization reaction of the polymerizable compound. As the photopolymerization initiator, a photoradical polymerization initiator or a photocationic polymerization initiator can be used. However, a photoradical polymerization initiator is preferably used.

As the photopolymerization initiator, an initiator that is soluble in water and a product obtained by dispersing a water-insoluble initiator in water can be included. The photopolymerization initiator is not particularly limited, and specific examples of thereof include acetophenone, 2,2-diethoxyacetophenone, p-dimethylaminoacetophenone, benzophenone, 2-chlorobenzophenone, p,p'-dichlorobenzophenone, p,p'-bisdiethylaminobenzophenone, Michler ketone, benzil, benzoin, benzoin methyl ether, benzoin ethyl ether, benzoin isopropyl ether, benzoin-n-propyl ether, benzoin isobutyl ether, benzoin-n-butyl ether, benzyl methyl ketal, 2,2-dimethoxy-1,2-diphenylethane-1-one, 1-hydroxycyclohexyl phenyl ketone, 2-hydroxy-1-{4-[4-(2-hydroxy-2-methylpropionyl) benzil]phenyl}2-methylpropane-1-one, 2-benzil-2-dimethylamino-1-(4-morpholinophenyl)butanone-1,2-dimethylamino-2-(4-methylbenzil)-1-(4-morpholine-4-yl-phenyl) butane-1-one, 2,4,6-trimethylbenzoyl diphenylphosphine oxide, bis(2,4,6-trimethylbenzoyl)phenylphosphine oxide, bis(2,6-dimethoxybenzoyl)-2,4,4-trimethylpentylphosphineoxide, 2-methyl-1-[4-(methylthio)phenyl]2-morpholinopropane-1-one, thioxanthone, 2-chlorothioxanthone, 2-hydroxy-2-methyl-1-phenyl-1-one, 1-(4-isopropylphenyl)-2-hydroxy-2-methylpropane-1-one, methyl benzoylformate, azobisisobutyronitrile, benzoyl peroxide, and di-tert-butyl peroxide. The photopolymerization initiators may be used singly, or two or more types thereof may be used in combination.

The content when a photopolymerization initiator is contained is preferably in the range of 0.1% by mass to 10% by mass, and more preferably in the range of 0.5% by mass to 8% by mass with respect to the total mass of the first ink composition. If the content is in the above range, curing properties of the ink become satisfactory.

Organic Solvent

The first ink composition may contain an organic solvent. The organic solvent is not particularly limited, and examples thereof include alkyl polyols, a pyrrolidone derivative, and glycol ethers. The organic solvents may be used singly, or two or more types thereof include in combination.

Examples of alkyl polyols include propylene glycol, dipropylene glycol, 1,2-butanediol, 1,2-pentanediol, 1,2-hexanediol, 1,2-heptanediol, 1,3-butyleneglycol, 3-methyl-1,3-butanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, 3-methyl-1,5-pentanediol, trimethylolpropane, and glycerin. These components may be used singly, or two or more types thereof may be used in combination. Alkyl polyols have a function of enhancing the wettability of ink onto a recording medium and suppressing drying and solidifying of ink.

The content when alkyl polyols are contained is in the range of 0.5% by mass to 10% by mass with respect to the total mass of the first ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. The components may be used singly, or two or more types thereof may be used in combination. The pyrrolidone derivative can function as a satisfactory solvent of the resin component. The content when the pyrrolidone derivative is contained is in the range of 0.5% by mass to 10% by mass with respect to the total mass of the first ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. The components may be used singly or two or more types thereof may be used in combination. Glycol ethers can control wetting properties and an infiltration rate to a recording medium of ink.

The content when glycol ethers are contained is in the range of 1% by mass to 30% by mass with respect to the total mass of the first ink composition.

Other Components

The first ink composition may contain a component contained in a common aqueous ink composition for ink jet recording or a common ultraviolet light curing ink composition, if necessary.

Volatile Component and Non-Volatile Component

In the invention, the "volatile component" contained in an ink composition refers to a component that volatilizes (evaporates) when ink is dried. Specifically, among the components described above, water, moisture contained in a resin emulsion, and an organic solvent are classified as volatile components.

Meanwhile, in the invention, the "non-volatile component" contained in the ink composition refers to a component that remains after ink is dried. Particularly, among the components, a coloring material, a resin dispersant that causes a pigment to be dispersed, a solid content of a resin emulsion, a polymerizable compound, a photopolymerization initiator, and a surfactant are classified as non-volatile component.

A content of a non-volatile component contained in the first ink composition when being converted into a solid content is preferably in the range of 3% by mass to 40% by mass and more preferably in the range of 10% by mass to 25% by mass, with respect to a total mass of the first ink composition. If the content is 3% by mass or greater, the first ink composition is sufficiently thickened by being dried, and thus, when the first ink composition comes into contact with the second ink composition on a recording medium, the generation of aggregation unevenness caused by excessive mixture of both ink compositions can be suppressed. In addition, if the content is 40% by mass or less, the viscosity of the first ink composition (that is, initial viscosity of first ink composition) when the first ink composition is ejected can be suppressed from being excessively high.

Physical Characteristics of First Ink Composition

As the first ink composition, an ink composition of which a viscosity at 20° C. when the ink composition is ejected from a first recording head described below (that is, ink composition when a volatile component contained in the first ink composition is not volatilized at all) is 15 mPa·s or less has to be used, and an ink composition of which a viscosity at 20° C. is 8 mPa·s or less is preferably used. In addition, an ink composition of which the lower limit value of the viscosity is 2 mPa·s or greater is preferably used. If the viscosity is 15 mPa·s or less, the ejection stability of the first ink composition becomes excellent.

As the first ink composition, an ink composition of which the viscosity at 20° C. when 50% by mass of a volatile component contained in the first ink composition is volatilized has to be 100 mPa·s or greater has to be used, and an ink composition of which the viscosity at 20° C. is 200 mPa·s or greater is preferably used. The upper limit is not particularly limited. If the viscosity is 100 mPa·s or greater, when the first ink composition comes into contact with the second ink composition on the recording medium, the excessive mixture of both ink compositions can be suppressed. Therefore, the generation of the aggregation unevenness caused by the mixture of both ink compositions can be suppressed.

In addition, in the invention, the viscosity of the ink composition can be obtained, for example, by being measured under the condition of 20° C. by using a viscoelastic testing machine MCR-300 (product name, manufactured by Anton Paar GmbH).

In view of balance between a quality of an image and reliability as ink jet ink, the first ink composition used in the ink jet recording method according to the embodiment has a surface tension at 20° C. preferably in the range of 15 mN/m to 50 mN/m and more preferably in the range of 20 mN/m to 40 mN/m. In addition, the surface tension is obtained, for example, by measuring the surface tension when a platinum plate is wet with the ink composition under the condition of 20° C. by using an automatic surface tensiometer CBVP-Z (product name, manufactured by Kyowa Interface Science Co., Ltd.).

1.2. Second Ink Composition

Coloring Material

The second ink composition contains the second coloring material different from the first coloring material. Specific examples of the second coloring material, the range of the content, and the like are the same as described for the first ink composition, so the description thereof is omitted.

Other Components

The second ink composition may contain a common aqueous ink composition for ink jet recording or a common ultraviolet light curing ink composition, if necessary. As the component, respective components described for the first ink composition described above (a surfactant, water, a resin emulsion, a polymerizable compound, a photopolymerization initiator, an organic solvent, and the like) are included, specific examples, advantages, a range of the content, and the like are as described for the first ink composition, and thus the description thereof is omitted.

Physical Characteristics of Second Ink Composition

In view of balance between a quality of an image and reliability as ink jet ink, the second ink composition used in the ink jet recording method according to the embodiment has a surface tension at 20° C. preferably in the range of 15 mN/m to 50 mN/m and more preferably in the range of 20 mN/m to 40 mN/m.

In addition, from the same point of view, the viscosity of the second ink composition at 20° C. is preferably in the range of 2 mPa·s to 15 mPa·s, and more preferably in the range of 2 mPa·s to 10 mPa·s.

1.3. Method of Preparing Ink Composition

The ink composition used in the ink jet recording method according to the embodiment can be obtained by mixing the components described above in an arbitrary sequence, filtering the components, if necessary, and removing impurities. As the mixing method of the respective components, a method of sequentially adding ingredients to a container having a stirring apparatus such as a mechanical stirrer or a magnetic stirrer and stirring the ingredients is suitably used. As the filtration method, centrifugal filtration, filter filtration, or the like can be performed, if necessary.

2. Ink Jet Recording Method

2.1. Apparatus Configuration

The ink jet recording method according to the embodiment can be performed by using an ink jet recording apparatus that ejects the first ink composition and the second ink composition described above. The ink jet recording apparatus includes a first recording head that ejects the first ink composition described above and a second recording head that ejects the second ink composition described above. The first recording head and the second recording head ejects respective ink compositions through fine nozzles provided thereto in droplet shapes, and causing the droplets to be attached to a recording medium. Hereinafter, the configuration of the ink jet recording apparatus according to the embodiment is described in detail with reference to the drawings. In addition, for better understanding of the structure of the ink jet recording apparatus according to the embodiment, scales may be appropriately changed. The temperature of the ink composition when the ink composition is ejected is not particularly limited, but in view of the ejection stability, the temperature is particularly 5° C. to 50° C., more particularly 10° C. to 45° C., and still more particularly 10° C. to 40° C.

FIG. 1 is a block diagram illustrating a configuration of an ink jet recording apparatus 1 (100) according to the embodiment. As illustrated in FIG. 1, the ink jet recording apparatus 1 (100) includes a transportation unit 10, a head unit 20, a detector group 60, and a controller 70. The ink jet recording apparatus 1 (100) that receives image data from an input section 80 to which the image data is input controls respective units by the controller 70. The controller 70 controls respective units based on the image data received from the input section 80, and records the image on a recording medium P. The state in the ink jet recording apparatus 1 (100) is monitored by the detector group 60, and the detector group 60 outputs the detection result to the controller 70. The controller 70 controls the respective units based on the detection result output from the detector group 60. The image data received by the ink jet recording apparatus 1 (100) from the input section 80 may be image data obtained by performing a process such as data conversion by the input section 80 on the image data input from another apparatus (not illustrated) to the input section 80.

Specifically, the controller 70 is a control unit (control portion) for controlling the ink jet recording apparatus 1 (100), and includes an interface portion 72, a CPU 74, a memory 76, and a unit control circuit 78. The interface portion 72 transmits and receives the data between the input section 80 and the ink jet recording apparatus 1 (100). The CPU 74 is an arithmetic processing device for performing overall control of the ink jet recording apparatus 1 (100). The memory 76 is to secure an area for storing a program of the CPU 74 and a working area, and includes a storage element such as RAM and EEPROM. The CPU controls the respective units via the unit control circuit 78, according to the program stored in the memory 76.

The input section 80 is a section for inputting image data to be recorded in the recording medium P, and includes, for example, a PC or a touch panel-type input device. The input section 80 may include a function of performing data conversion on the image data input from another device. The input section 80 may be, for example, a PC in which a printer driver that controls the ink jet recording apparatus 1 (100) is installed. The image data input into the PC performs data processing for converting the data before the data processing (for example, image data in JPEG format) to data appropriate for performing recording on the recording medium P by the ink jet recording apparatus 1 (100) (for example, image data in dot format).

Serial Printer

Figure 2:
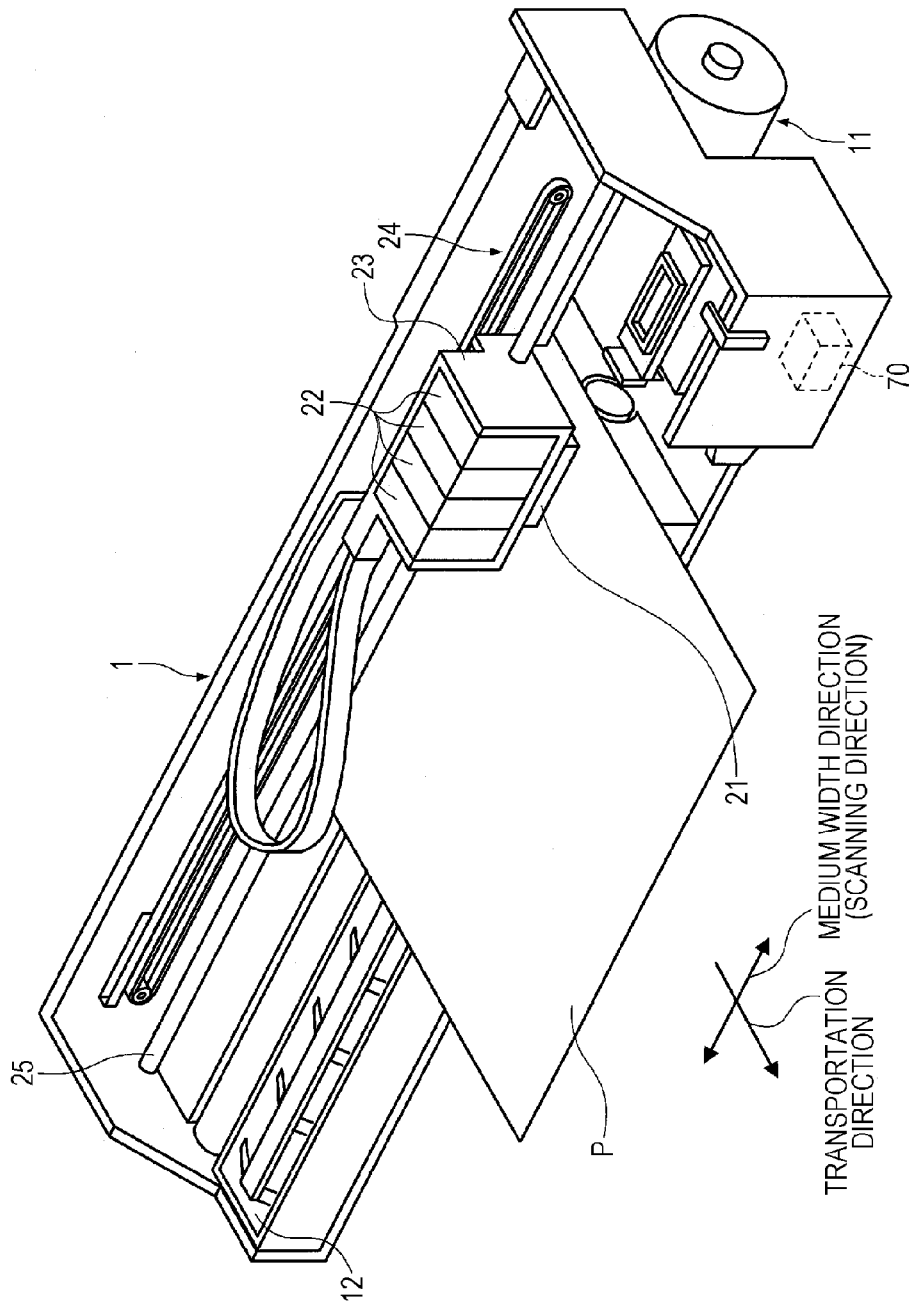
FIG. 2 is a diagram schematically illustrating a configuration of a serial printer that can be used in the ink jet recording method according to an embodiment.

FIG. 2 is a perspective view schematically illustrating a structure of the ink jet recording apparatus 1, and an example in which the ink jet recording apparatus is a serial printer. Hereinafter, the ink jet recording apparatus 1 illustrated in FIG. 2 is also called the serial printer 1.

The ink jet recording method according to the embodiment can be performed by using the serial printer 1 as illustrated in FIG. 2. The serial printer refers to a printer including a mechanism in which a recording head is mounted on a carriage that moves in a predetermined direction, and an ink droplet is ejected to a recording medium by the movement of a recording head accompanied by the movement of the carriage.

As illustrated in FIG. 2, the serial printer 1 includes a transportation mechanism 11 that transports the recording medium P in a transportation direction, a platen 12 that supports the recording medium P that is arranged on the lower side of a head 21, and transported, a carriage 23 on which the head 21 is mounted, an ink cartridge 22 that is detachably mounted, and a carriage moving mechanism 24 that moves the carriage 23 in a medium width direction of the recording medium P. Further, the serial printer 1 has the aforementioned controller 70 that controls the overall operations of the printer 1. In addition, in FIG. 2, the medium width direction is a main scanning direction in which the head performs scanning, and the transportation direction is a direction intersecting the medium width direction.

Transportation rollers 11 and the platen 12 are examples of components of the transportation unit 10 in FIG. 1. The transportation roller 11 transports the fed recording medium P in response to an instruction from the controller 70 in the transportation direction. In addition, the platen 12 supports the transported recording medium P.

The recording head 21, the ink cartridge 22, the carriage 23, and the carriage moving mechanism 24 are examples of the components of the head unit 20, and form an image by ejecting droplets of ink to the recording medium P in response to the instruction from the controller.

The carriage 23 is installed in a state of being supported by a guide rod 25 that is a supporting member built in the medium width direction. The carriage 23 moves in the medium width direction along the guide rod 25 by the carriage moving mechanism 24, in response to the instruction from the controller 70. In addition, in the example of FIG. 2, the movement of the carriage 23 in the medium width direction is illustrated, but the invention is not limited thereto, and in addition to the movement of the medium width direction, a mechanism that moves in the transportation direction may be provided.

The ink cartridge 22 is formed of 4 independent cartridges. Each of the 4 cartridges is filled independently with the first ink composition and the second ink compositions described above. In addition, in the example of FIG. 2, the number of cartridges is 4, but the number is not limited thereto, and a desired number of cartridges can be mounted. The ink cartridge 22 is not limited to a cartridge mounted on the carriage 23 as illustrated in FIG. 1, and, in substitution for this, for example, may be a cartridge that is mounted on a housing side of the serial printer 1 and supplies ink to the head 21 via an ink supplying tube.

The recording head 21 changes its own position with respect to the recording medium P in association with the movement of the carriage 23, and ejects the droplets of the ink from a predetermined nozzle in response to the instruction from the controller 70.

Figure 3:
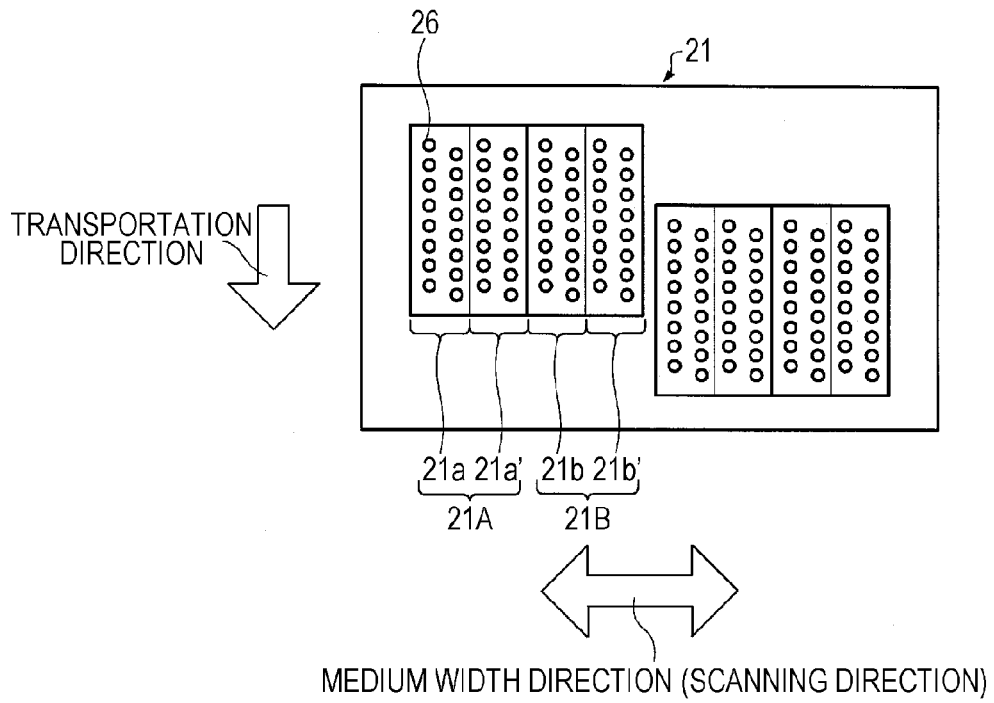
FIG. 3 is a diagram schematically illustrating a nozzle surface of a recording head in a serial printer according to a first aspect.
Figure 4:
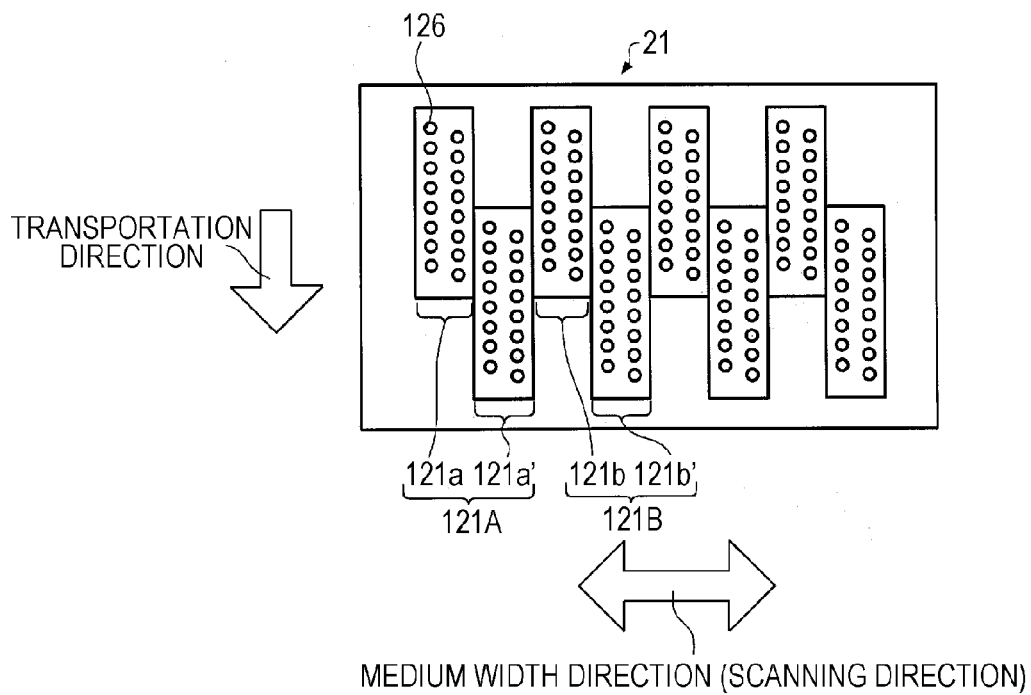
FIG. 4 is a diagram schematically illustrating a nozzle surface of a recording head in a serial printer according to a second aspect.

FIGS. 3 and 4 are diagrams schematically illustrating a nozzle surface of a recording head. The nozzle surface is provided to face the recording medium P. The recording head 21 according to the embodiment can have, for example, a structure illustrated in FIG. 3 or 4. As illustrated in FIGS. 3 and 4, the recording head 21 includes plural recording heads such as a first recording head 21A (121A) that ejects a first ink composition and a second recording head 21B (121B) that ejects the second ink composition.

In FIG. 3, the first recording head 21A includes a first nozzle group block 21a and a second nozzle group block 21a'. The first nozzle group block 21a and the second nozzle group block 21a' are respectively formed of plural nozzle holes 26. The plural nozzle holes 26 are arranged in the transportation direction. In the first nozzle group block 21a, nozzles that belong to the block are arranged at different positions in the transportation direction so that a nozzle group which is a predetermined nozzle pitch in the transportation direction is formed by the block. The second nozzle group block 21a' is formed in the same manner.

In addition, in FIG. 3, the second recording head 21B includes a first nozzle group block 21b and a second nozzle group block 21b'. The relationship between the first nozzle group block 21b and the second nozzle group block 21b' is the same as that between the first nozzle group block 21a and the second nozzle group block 21a' of the first recording head 21A, and thus the description thereof is omitted.

For example, if one nozzle group block is filled with one ink composition (for example, first ink composition), a maximum of four ink compositions can be used in one recording head. Also, if the filling configuration of the second recording head 21B with ink compositions is caused to be the same as that of the first recording head 21A, the width of a medium that can perform recording by one time of scanning in the transportation direction can be caused to be longer than the case where one recording head is used. In addition, among the nozzles in the first recording head and the nozzles in the second recording head, nozzles filled with the same ink compositions and provided at the same positions with each other in the transportation direction (existing in a portion near the center in the transportation direction in FIG. 3) can be adjusted by using one of the nozzles or by ejecting ink in half of an original mass from both of the nozzles. With respect to FIGS. 4 to 5B described below, the configurations are the same.

In FIG. 4, the first recording head 121A includes a first nozzle group block 121a and a second nozzle group block 121a'. The first nozzle group block 121a and the second nozzle group block 121a' have different positions from each other in the scanning direction (medium width direction), and are provided so that positions thereof in a direction intersecting to the scanning direction (transportation direction) are different from each other. The first nozzle group block 121a and the second nozzle group block 121a' are formed of plural nozzle holes 126, respectively. The plural nozzle holes 126 are arranged in a medium transportation direction.

In addition, in FIG. 4, the second recording head 121B includes a first nozzle group block 121b and a second nozzle group block 121b'. Since the relationship between the first nozzle group block 121b and the second nozzle group block 121b' is the same as that between the first nozzle group block 121a and the second nozzle group block 121a' of the first recording head 121A, the description thereof is omitted. Further, a third recording head and a fourth recording head (no reference numerals of the drawings are provided) that have the same relationship as that between the first recording head and the second recording head are provided on the right side of the second recording head in the diagram. Also, if two nozzle group blocks in one recording head are filled with the same ink composition (for example, first ink composition) and each recording head is filled with a different ink composition, a maximum of four ink compositions can be used in four recording heads.

If the first nozzle group block 121a and the second nozzle group block 121a' have the same positional relationship as that illustrated in FIG. 4, an image recording step described below has an advantage as follows. That is, since a time after the first ink composition is ejected to a predetermined area of a recording medium and before the second ink composition is ejected to the predetermined area can be secured, the first ink composition can come into contact with the second ink composition in a state of being sufficiently thickened. As a result, the generation of the aggregation unevenness caused by the mixture of the first ink composition and the second ink composition can be suppressed.

The serial printer 1 may include a heating mechanism (not illustrated) that heats the recording medium. As long as the heating mechanism is installed at a position that can heat the recording medium P, the installation position thereof is not particularly limited. The heating mechanism can be installed, for example, on the platen 12, and at a position facing the recording head 21. In this manner, if the heating mechanism is installed at a position facing the recording head 21, the attachment position of the droplet on the recording medium P can be surely heated so that the droplet attached to the recording medium P can be effectively dried.

As the heating mechanism, for example, a print heater mechanism that causes the recording medium P to come into contact with a heat source and heat the recording medium P, a mechanism that performs irradiation with infrared light, a microwave (electromagnetic wave having a maximum wavelength of about 2,450 MHz), or the like, or a dryer mechanism that blows hot air may be used.

The heating of the recording medium P by a heating mechanism is performed before a droplet ejected from a nozzle is attached to the recording medium P or when a droplet ejected from a nozzle is attached to the recording medium P. In this manner, the droplet attached to the recording medium P can be promptly dried. In addition, the overall conditions of the heating (for example, whether to perform the heating, the timing of the heating, the heating temperature, or the heating time) are controlled by the controller 70.

If the ultraviolet light curing ink composition is used, the serial printer 1 may include an irradiation section (not illustrated) so as to cure the droplet of the ink attached to the recording medium.

The irradiation section may be installed in any position as long as the irradiation section can irradiate the ultraviolet light curing ink composition attached to the recording surface with the ultraviolet light, and the irradiation section can be installed between respective recording heads, for example, at a portion between the first recording head and the second recording head. In addition, the irradiation section may be provided so that irradiation can be performed in the medium width direction, and this may be used in combination with an irradiation section provided between recording heads.

The irradiation section includes a light source (not illustrated), and a light source control circuit (not illustrated) that controls whether to switch on or off the light source. As the light source, an ultraviolet light emitting diode is preferably used. Accordingly, compared with the case where a mercury lamp, a metal halide lamp, the other lamps, and the like are used as the light source, the increase of the light source in size or in weight can be prevented. Therefore, the burden at the time of moving the carriage 23 can be reduced.

In addition, when the ultraviolet light emitting diode is used as the light source, the emission peak wavelength of the emitted ultraviolet light may be in the range of 350 nm to 420 nm.

Line Printer

Figure 5A:
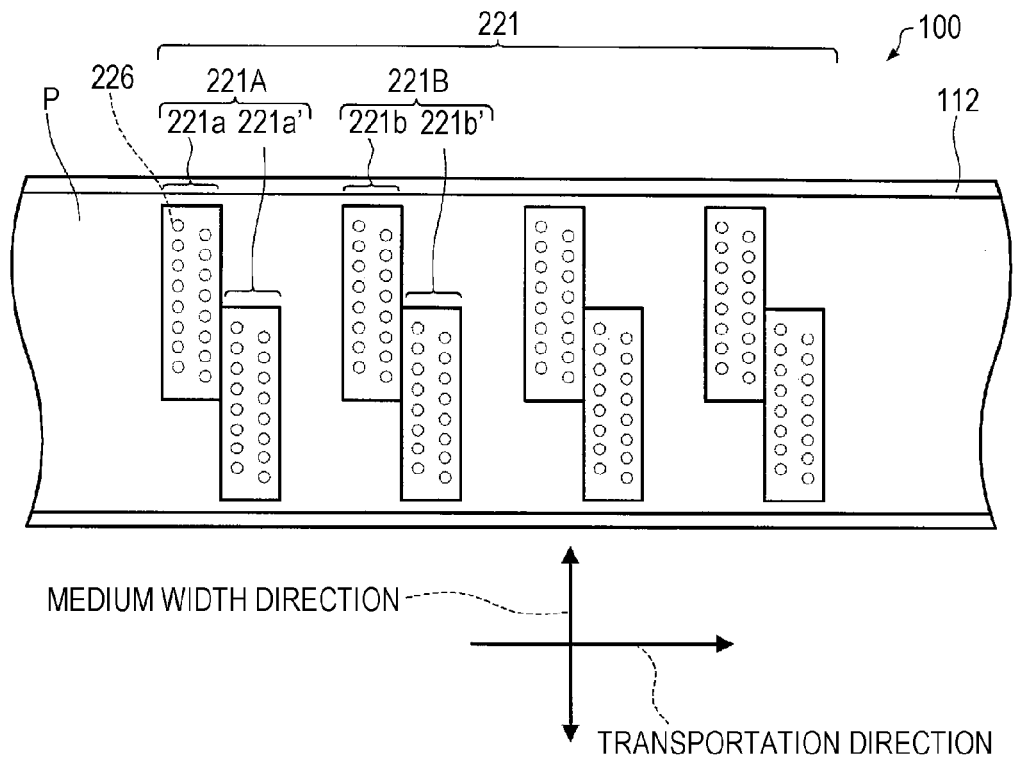
FIGS. 5A and 5B are diagrams schematically illustrating a line printer that can be used in the ink jet recording method according to the embodiment.
Figure 5B:
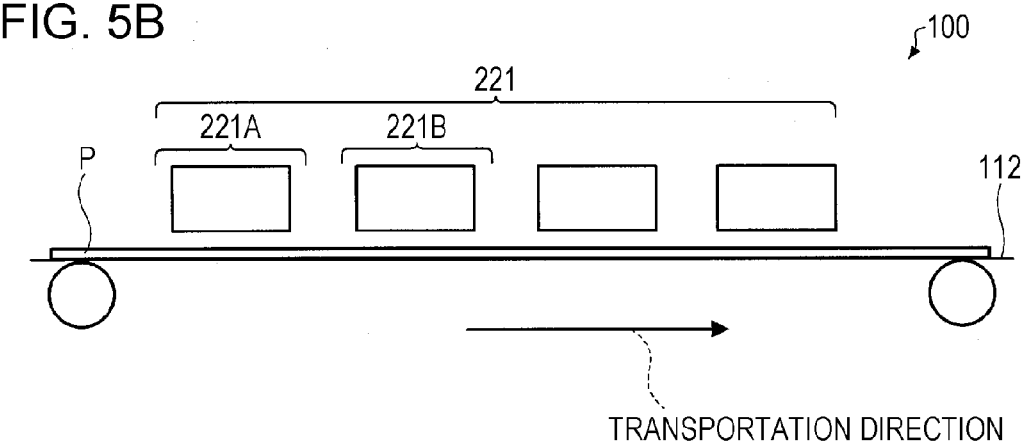

FIGS. 5A and 5B are diagrams schematically illustrating a portion of the structure when the ink jet recording apparatus 100 is viewed from the front surface, and an example in which the ink jet recording apparatus is a line printer. The ink jet recording method according to the embodiment can be performed by using the line printer 100 as illustrated in FIGS. 5A and 5B. Hereinafter, the ink jet recording apparatus 100 illustrated in FIGS. 5A and 5B is called the line printer 100. The line printer refers to a printer in which one of the recording medium or the recording head is fixed when an image is recorded, so that the droplet of the ink is ejected by the plural nozzles installed throughout the entire body in the medium width direction.

FIG. 5A is a diagram schematically illustrating a portion near a recording area of the line printer 100 viewed from the front surface. In addition, FIG. 5B is a diagram schematically illustrating FIG. 5A from one side. As illustrated in FIGS. 5A and 5B, the line printer 100 includes a platen 112 that transports the recording medium P in the transportation direction and a recording head 221 that extends in a medium width direction. In addition, though not illustrated, the controller 70 that controls the overall operations in the same manner as in the serial printer 1 of FIG. 2 is provided at an arbitrary position in the line printer 100.

The platen 112 is an example of components of the transportation unit 10 in FIG. 1. As long as the transportation unit 10 can transport the recording medium P, the transportation unit 10 is not limited to the platen 112, a well-known mechanism can be used. The platen 112 transports the fed recording medium P in the transportation direction in response to the instruction from the controller 70. In the example of FIGS. 5A and 5B, the platen 112 is self-driven so that the recording medium P supported by the platen 112 moves in the transportation direction.

The recording head 221 is an example of components of the head unit 20 in FIG. 1. The recording head 221 is formed in the width direction of the recording medium. The recording head 221 ejects a droplet of the ink from a predetermined nozzle in response to the instruction from the controller 70. As illustrated in FIGS. 5A and 5B, the recording head 221 includes plural recording heads such as a first recording head 221A that ejects the first ink composition and a second recording head 221B that ejects the second ink composition. Specifically, four recording heads are included in the example of FIGS. 5A and 5B, but the invention is not limited thereto, and two or more recording heads may be included.

In FIGS. 5A and 5B, the first recording head 221A includes a first nozzle group block 221a and a second nozzle group block 221a'. The first nozzle group block 221a and the second nozzle group block 221a' have different positions from each other in the medium width direction. The first nozzle group block 221a and the second nozzle group block 221a' are formed of plural nozzle holes 226. The plural nozzle holes 226 are arranged in the medium width direction.

In addition, in FIGS. 5A and 5B, the second recording head 221B includes a first nozzle group block 221b and a second nozzle group block 221b'. Since the relationship between the first nozzle group block 221b and the second nozzle group block 221b' is the same as that between the first nozzle group block 221a and the second nozzle group block 221a' of the first recording head 221A, the description thereof is omitted. The ink filling configuration in FIGS. 5A and 5B may be the same as that in FIG. 4.

In FIGS. 5A and 5B, the first recording head and the second recording head have a long distance between them in the transportation direction. If the distance between the recording heads is adjusted, the time after one ink composition is ejected and before the next ink composition is ejected can be adjusted. The same adjustment can be performed in FIG. 4.

The line printer 100 may include a heating mechanism (not illustrated) that heats the recording medium. As long as the heating mechanism is provided at a position that can heat the recording medium P, the installation position is not particularly limited. For example, the heating mechanism may be installed on the lower side of the platen 112 and at a position facing the recording head 121. In this manner, if the heating mechanism is provided on a position facing the head 121, the attachment position of the droplet on the recording medium P can be surely heated so that the droplet attached to the recording medium P can be effectively dried. The mechanism that can be used in the heating mechanism or the heating timing, and the control of the overall conditions of the heating are the same as those in the serial printer 1 described above. Therefore, the description thereof is omitted.

When the line printer 100 uses the ultraviolet light curing ink composition, the irradiation section (not illustrated) for curing the droplet of the ink attached to the recording medium may be included. The irradiation section is provided at any position as long as the irradiation section can irradiate the ultraviolet light curing ink composition attached to the recording surface with the ultraviolet light. For example, the irradiation section may be provided between recording heads such as a portion between the first recording head 221A and the second recording head 221B. The irradiation section may be installed so as to perform irradiation along the medium width direction.

Recording Medium

The recording medium P is not particularly limited, but the ink jet recording method according to the embodiment is preferably used when a low-ink-absorbing recording medium is used. The low-ink-absorbing recording medium has a lower ink absorbing property than an ink absorbing recording medium such as plain paper. Therefore, the first ink composition and the second ink composition are easily mixed with each other on the recording medium, and thus a problem of aggregation unevenness described above is easily generated.

Here, the "low-ink-absorbing recording medium" may be a recording medium in which the amount of the water absorption when 30 msec$^{1/2}$ has passed from the start of the contact in the Bristow method is 10 mL/m$^2$ or less, and at least a recording surface has the property. According to this definition, the "low-ink-absorbing recording medium" according to the invention also includes a non-ink-absorbing recording medium that does not absorb water at all. The Bristow method is the most common method of measuring a liquid absorption amount in a short time, and is adopted by Japan Technical Association of the Pulp and Paper Industry (JAPAN TAPPI). The details of the test method are described in Standard No. 51 "Paper and Paperboard-Liquid Absorbency Test Method-Bristow Method" of "Japan TAPPI Paper and Pulp Test Methods 2000".

Specific examples of the low-ink-absorbing recording medium includes a sheet, a film, a textile product, and the like containing a low absorbing material. In addition, the low-ink-absorbing recording medium may be a recording medium including a layer containing a low absorbing material (hereinafter, referred to as "low absorbing layer") on the surface of a base material (for example, paper, fiber, leather, plastic, glass, ceramics, and metal). The low absorbing material is not particularly limited, and may include an olefin-based resin, an ester-based resin, a urethane-based resin, an acryl-based resin, and a vinyl chloride-based resin. In addition, overall characteristics such as thickness, a shape, a color, a softening temperature, hardness, and the like of the low-ink-absorbing recording medium are not particularly limited.

2.2. Steps

The ink jet recording method according to the embodiment includes an image recording step, and one of the characteristics is that, in the image recording step, the time after the first ink composition is ejected to a predetermined area of the recording medium and before the second ink composition is ejected to the predetermined area is in the range of 10 ms to 2,000 ms. Hereinafter, the ink jet recording method according to the embodiment is specifically described for each step.

2.2.1. Image Recording Step

The image recording step is a step of recording an image on the recording medium by causing the first recording head and the second recording head to eject the first ink composition and the second ink composition while relative positions thereof with respect to the recording medium are changed. In this manner, a recorded matter in which an image is recorded (formed) on the recording medium can be obtained.

If the serial printer 1 described above is used, an image is formed when the scanning (pass) of causing the recording head 21 to eject ink while the recording head 21 is moved relatively to the recording medium P is performed one time, and thus an image desired to be finally obtained can be obtained when the pass is performed plural times. Meanwhile, if the line printer 100 as described above is used, an image is formed when the scanning (pass) of causing the recording head 121 to eject ink while the recording head 121 is moved relatively to the recording medium P is performed one time, and thus an image desired to be finally obtained can be obtained when the pass is performed one time.

Examples of a type of ejecting ink from a nozzle of a recording head include the following types. Specific examples thereof include a type of performing recording by applying an intense electric field between a nozzle and an acceleration electrode positioned on a forward side of the nozzle, continuously ejecting ink in a droplet shape from the nozzle, and applying a record information signal to deflecting electrodes while the droplet of the ink travels between the deflecting electrodes or a type of ejecting a droplet of ink corresponding to a record information signal without deflecting the droplet of the ink (electrostatic suction type ejection), a type of forcefully ejecting droplet of ink by applying pressure to ink with a small pump and causing a nozzle to mechanically vibrate with a quartz oscillator or a type of ejecting a droplet of ink and performing recording by simultaneously applying pressure and a record information signal to ink with a piezoelectric element (piezo type ejection), and a type of ejecting a droplet of ink and performing recording by heating and foaming ink with a microelectrode in response to a record information signal (thermal jet type ejection).

In the image recording step, a time after the first ink composition is ejected to a predetermined area of the recording medium and before the second ink composition is ejected to the predetermined area (hereinafter, also referred to as "ejection time interval") has to be in the range of 10 ms to 2,000 ms, is preferably in the range of 20 ms to 2,000 ms, and is more preferably in the range of 20 ms to 1,000 ms. If the ejection time interval is 10 ms or greater, the first ink composition attached to the recording medium is sufficiently thickened and then the first ink composition and the second ink composition come into contact with each other on the recording medium. Therefore, the generation of the aggregation unevenness caused by the excessive mixture of both ink compositions can be suppressed. In addition, if the ejection time interval is 2,000 ms or less, the image can be recorded at high speed. Meanwhile, if the ejection time interval is less than 10 ms, the mixture of the first ink composition and the second ink composition on the recording medium excessively progresses, and the aggregation unevenness is generated. If the ejection time interval is greater than 2,000 ms, the recording speed of an image significantly decreases.

The ejection time interval described above can be calculated in the following manner. The relative movement speed between the recording head and the recording medium is set to be A (m/s). In the relative movement direction of the recording head and the recording medium, a distance between a nozzle provided on the first recording head and a nozzle provided on the second recording head (shortest distance) is set to be B (mm). In this case, a time C (ms) calculated by B/A is the aforementioned ejection time interval after the first ink composition is ejected and before the second ink composition is ejected. In this manner, the ejection time interval can be easily caused to be in the scope by appropriately adjusting the relative movement speed A or the distance B between the nozzles. In addition, when the serial printer is used, the "A" corresponds to scanning speed of the head (movement speed of carriage at the time of recording), and a relative movement direction in the "B" corresponds to a movement direction of the head (movement direction of carriage). In addition, when a line printer is used, the "A" corresponds to a transportation speed of the recording medium, and the relative movement direction in the "B" corresponds to the transportation direction of the recording medium.

Specifically, the lower limit of the relative movement speed A between the recording head and the recording medium is preferably 0.1 m/s or higher, and more preferably 0.25 m/s or higher. In addition, the upper limit of the relative movement speed A is preferably 1.5 m/s or lower, and more preferably 1.25 m/s or lower.

In addition, the distance B between a nozzle provided on the first recording head and a nozzle provided on the second recording head (shortest distance) is preferably in the range of 0.1 mm to 1,000 mm. Particularly, if the serial printer described above is used, the distance B between the nozzles is preferably in the range of 1 mm to 50 mm, and more preferably in the range of 5 mm to 20 mm. If the line printer described above is used, the distance B between the nozzles is in the range of 50 mm to 500 mm, and more preferably in the range of 75 mm to 150 mm.

In the image recording step, when the second ink composition is ejected to the predetermined area described above, the volatile component contained in the first ink composition attached to the predetermined area is preferably volatilized (evaporated) by 50% or more, and is more preferably volatilized (evaporated) in the range of 50% to 70%, with respect to the volatile component originally contained in the first ink composition. If the volatile component of the first ink composition is volatilized by 50% or more, the thickening of the first ink composition attached to the predetermined area sufficiently progresses (viscosity of the first ink composition described above is 100 mPa·s or greater), and thus the excessive mixture of the first ink composition and the second ink composition is hardly generated. As a result, the generation of the aggregation unevenness can be suppressed. In addition, if the volatile component of the first ink composition is volatilized by 70% or less, drying properties of the first ink composition is caused to be in a proper range, and thus the clogging or the like of a nozzle can be suppressed from occurring.

In the image recording step, the record resolution in the relative movement direction between the recording head and the recording medium is preferably in the range of 180 dpi to 2,880 dpi. If the record resolution is less than 180 dpi, the ejected ink droplet becomes large, the evaporation speed of the ink droplet becomes slow, and the aggregation unevenness is easily generated. Meanwhile, the resolution is greater than 2,880 dpi, the ejected ink droplet becomes too small, the ink droplet is easily influenced by static electricity or the like, and thus a travel curve or the like is easily generated.

The mass for each droplet of the first ink composition ejected from the first recording head is preferably in the range of 0.1 ng to 10 ng. If the mass is in the range, the drying of the first ink composition attached to the recording medium easily progresses, and thus the excessive mixture of the first ink composition and the second ink composition can be suppressed, and the generation of the aggregation unevenness can be suppressed.

2.2.2. Heating Step

The ink jet recording method according to the embodiment may include a heating step. The heating step is a step of being performed between the ejection of the first ink composition and the ejection of the second ink composition, in the image recording step described above and heating the recording medium. According to this, the first ink composition and the second ink composition can come into contact with each other after the first ink composition attached to the recording medium is sufficiently thickened, and thus the generation of the aggregation unevenness can be suppressed.

In the heating step, the lower limit of the surface temperature of the recording medium (that is, temperature in image recording portion of recording medium) is preferably 35° C. or higher, and more preferably 40° C. or higher. In addition, the upper limit is preferably 80° C. or lower, more preferably 70° C. or lower, still more preferably 60° C. or lower, and particularly preferably 50° C. or lower. If the temperature is 35° C. or higher, the drying speed of the image is further improved. In addition, if the temperature is 80° C. or lower, the decrease of the recording stability can be suppressed. The surface temperature of the recording medium can be easily set to a predetermined temperature range by using the heating mechanism described above. In addition, the heating step can be performed at any timing: before the ejection of ink, at the time of the ejection, and after the ejection.

2.2.3. Irradiation Step

The ink jet recording method according to the embodiment may include an irradiation step. The irradiation step is a step of irradiating the first ink composition attached to the recording medium with ultraviolet light so as to cure the first ink composition when the first ink composition is the ultraviolet light curing ink composition described above. The irradiation step is performed by the irradiation section described above. Accordingly, the thickening accompanied by the curing of the first ink composition is promoted, and thus the generation of the aggregation unevenness caused by the excessive mixture of the first ink composition and the second ink composition can be suppressed.

The irradiation of the first ink composition attached to the predetermined area of the recording medium with the ultraviolet light is preferably performed before the second ink composition is attached to the predetermined area. Accordingly, the generation of the aggregation unevenness caused by the mixture of the first ink composition and the second ink composition on the predetermined area can be further suppressed.

3. Examples

Hereinafter, examples and comparative examples are described in detail, but the invention is not limited only to the examples.

3.1. Preparation of Ink Composition

In order to prepare ink compositions described in Table 1, respective components were introduced to containers, stirred and mixed for 2 hours with a magnetic stirrer, and filtrated by a membrane filter having 5 μm of a diameter so that impurities such as wastes and coarse particles are removed. In this manner, Ink 1 to 7 was obtained. In addition, all numerical values of the ink compositions in Table 1 are presented by % by mass. In addition, contents of the resin emulsion, the polymerizable compound, and the photopolymerization initiator are values converted into solid contents.

Components presented in Table 1 are as follows.
Water
1,2-hexanediol(1,2-HD)
Propylene glycol (PG)
2-pyrrolidone (2-Py)
Pigment Blue 15:3 (PB 15:3, cyan pigment)
Resin emulsion (product name, "Joncryl 7610", manufactured by BASF SE, core shell-shaped styrene acrylic resin)
Polymerizable compound (product name, "Laromer 8983", manufactured by BASF SE, water dispersible aromatic urethane acrylate)
Photopolymerization initiator (product name, "IRGACURE 819DW", BASF Japan Ltd., water soluble acylphosphine oxide-based photopolymerization initiator)
BYK-348 (product name, manufactured by BYK Japan KK, silicone-based surfactant)

With respect to the ink, viscosities when volatile components were not volatilized at all and viscosities when 50% of volatile components were volatilized under the condition of 20° C. were measured by using a viscoelastic testing machine MCR-300 (product name, manufactured by Anton Paar GmbH). Values of the obtained viscosities are presented in Table 1.

TABLE 1

|  |  |  | Ink 1 | Ink 2 | Ink 3 | Ink 4 | Ink 5 | Ink 6 | Ink 7 |
|---|---|---|---|---|---|---|---|---|---|
| Ink composition (concentration) | Volatile component | Water | 66.5 | 66.5 | 71.5 | 51.5 | 81.5 | 66.9 | 61.5 |
|  |  | 1,2-HD | 3 | 3 | 3 | 3 | 3 | 3 | 3 |
|  |  | PG | 15 | 17 | 2 | 12 | 7 | 15 | 17 |
|  |  | 2-Py | 3 | 3 | 3 | 3 | 3 | 3 | 3 |
|  | Non-volatile component | PB15:3 | 3 | 3 | 3 | 3 | 3 | 3 | 3 |
|  |  | Resin emulsion | 9 | — | 17 | 27 | 2 | 9 | 12 |
|  |  | Polymerizable compound | — | 6 | — | — | — | — | — |
|  |  | Photocuring initiator | — | 1 | — | — | — | — | — |
|  |  | BYK-348 | 0.5 | 0.5 | 0.5 | 0.5 | 0.5 | 0.1 | 0.5 |
|  | Total mass (% by mass) |  | 100 | 100 | 100 | 100 | 100 | 100 | 100 |
| Viscosity (mPa·s) | When 0% was volatilized (unvolatilized) |  | 10 | 9 | 15 | 40 | 6 | 9 | 20 |
|  | When 50% was volatilized |  | 200 | 150 | 300 | 2000 | 70 | 150 | 400 |
| Total of volatile components (% by mass) |  |  | 87.5 | 89.5 | 79.5 | 69.5 | 94.5 | 87.9 | 84.5 |
| Total of non-volatile components (% by mass) |  |  | 12.5 | 10.5 | 20.5 | 30.5 | 5.5 | 12.1 | 15.5 |

3.2. Printing Mode

Evaluation tests were performed by appropriately selecting printing modes presented in Table 2. Specifically, in Modes 1 and 2, an apparatus obtained by reforming a serial printer (product name, "PX-G930", manufactured by Seiki Epson Corp.), mounting recording heads having the structure illustrated in FIG. 3, and installing a heating device that heats a recording medium at a position that faces the recording heads was used. In Modes 3 and 4, an apparatus obtained by reforming a serial printer (product name, "PX-G930", manufactured by Seiko Epson Corp.), mounting recording heads having the structure illustrated in FIG. 4, and installing a heating device In addition, as the recording heads having the structures of FIGS. 3 and 4, recording heads configured with plural heads including the first recording head, the second recording head, and the like, and having an overall configuration in which a length in the recording medium transportation direction was 2 inches and a nozzle density in the recording medium transportation direction was 600 dpi were used. As the recording heads having the structure of FIGS. 5A and 5B, recording heads configured with plural heads including the first recording head, the second recording head, and the like, and having an overall configuration in which a length in the recording medium width direction was 2 inches and a nozzle density in the recording medium width direction was 600 dpi were used.

TABLE 2

| Print mode | Mode 1 | Mode 2 | Mode 3 | Mode 4 | Mode 5 | Mode 6 | Mode 7 | Mode 8 | Mode 9 |
|---|---|---|---|---|---|---|---|---|---|
| Type of print | Serial | Serial | Serial | Serial | Serial | Line | Line | Line | Line |
| Print width | 64 inches | 64 inches | 64 inches | 64 inches | 64 inches | 2 inches | 2 inches | 2 inches | 2 inches |
| Distance between nozzles of respective colors (B) [mm] | 8.34 | 8.34 | 16.68 | 16.68 | 16.68 | 100 | 100 | 100 | 100 |
| Scanning speed of head in serial printing or relative speed between base material and head in line printing (A) [m/s] | 0.76 | 0.51 | 0.76 | 0.51 | 0.76 | 0.5 | 0.1 | 20 | 0.04 |
| Time until secondary color was ejected (C) [ms] | 10.94 | 16.42 | 21.89 | 32.83 | 21.89 | 200 | 1000 | 5 | 2500 |
| Temperature of image recorded portion (° C.) | 50 | 50 | 50 | 50 | 50 | 25 | 25 | 50 | 50 |
| Presence/Absence of UV lamp | Absent | Absent | Absent | Absent | Present | Absent | Absent | Absent | Absent |
| Structure of recording head | FIG. 3 | FIG. 3 | FIG. 4 | FIG. 4 | FIG. 4 | FIGS. 5A and 5B | FIGS. 5A and 5B | FIGS. 5A and 5B | FIGS. 5A and 5B |
| Paper feeding speed (mm/min) | 0.36 | 0.24 | 0.36 | 0.24 | 0.36 | 30 | 6 | 1200 | 2.4 |
| Printing speed (m²/hr) (64-inch width in serial printing and 2-inch width in line printing) | 34.78 | 23.19 | 34.78 | 23.19 | 34.78 | 91.44 | 18.29 | 3657.6 | 7.32 | that heats a recording medium at a position that faces the recording heads was used. In Mode 5, an apparatus obtained by reforming a serial printer (product name, "PX-G930", manufactured by Seiko Epson Corp.), mounting recording heads having the structure illustrated in FIG. 4, placing a LED irradiation device having 395 nm of a peak wavelength between respective recording heads, and installing a heating device that heats a recording medium at a position that faces the recording heads was used. In Modes 6 to 9, an apparatus obtained by fixing print heads and mounting a stage portion with which the heads were able to be relatively scanned was used as a line printer, and a recording medium with the stage portion was transported to perform printing evaluation.

3.3. Evaluation Test

As described in examples and comparative examples, the ink and print modes were combined to perform the following evaluation tests. In addition, Ink 1 to 7 was introduced so as to be ejected from the first recording head as the first ink composition. In addition, when Print Mode was used, after the first ink composition was ejected (after first ink composition was ejected and before second ink composition was ejected in evaluation of aggregation unevenness), and the irradiation with ultraviolet light was performed in irradiation energy of 20 mJ/cm² by a light source which is an ultraviolet light emitting diode having 395 nm of a peak wavelength. In addition, if Ink 2 was used as the first ink composition, after the attachment of the ink was completely ended, the irradiation with ultraviolet light was performed in irradiation energy of 400 mJ/cm$^2$ by the same irradiation light source as in Mode 5, to perform main curing.

In addition, "NP coated paper" (product name, manufactured by Lintec Corporation) was used as the recording medium.

3.3.1. Printing Speeds

As evaluations of printing speeds, it was assumed to use 8 recording heads, a printing width was set to 64 inches when a serial printer was used, and a printing width was set to 2 inches when a line printer was used, to calculate printed area per one hour.

Specifically, when a 64-inch width was printed by 4 passes by using a serial printer (in time for 4 passes, printing progressed by width of head (2 inches)), a paper feeding speed [m/min] became 0.468×A [m/min]. In addition, the "A" indicates relative movement speed between the recording head and the recording medium and the value is as presented in Table 3. Specifically, $\{(64 \times 25.4 \times 10^{-3})/(60 \times A)\} \times 4$ [min] of time was required for proceeding $2 \times 25.4 \times 10^{-3}$ [m] of printing (for 2-inch heads). In this manner, printing speeds [m$^2$/hr] in a 64-inch width were calculated.

Meanwhile, when a line printer was used, printing speeds [m$^2$/hr] for a 2-inch width were calculated.

Evaluation criteria were as follows.
A: Printed area for 1 hour was greater than 30 m$^2$
B: Printed area for 1 hour was greater than 10 m$^2$ and 30 m$^2$ or less
C: Printed area for 1 hour was 10 m$^2$ or less 3.3.2. Ejection Stability According to combinations of ink and recording modes described in examples and comparative examples, printing was continuously performed for 20 minutes.

Evaluation criteria were as follows.
A: State in which non ejection or disordered ejection were slightly occur during ejection in some cases, but were restored during ejection if continuous printing was further performed
B: State in which non ejection or disordered ejection were slightly occur during ejection in some cases, and were not restored even if continuous printing was further performed, but were restored to be a normal state by maintenance
C: State in which non ejection or disordered ejection were slightly occur during ejection in some cases, were not restored even if continuous printing was further performed, and were not restored even by maintenance 3.3.3. Aggregation Unevenness Ink in which coloring materials of the ink used in the examples and comparative examples were substituted with Pigment Red 122 was prepared, and used as the second ink composition, and recording was performed by using the first ink composition and the second ink composition at even duty. It was determined whether aggregation unevenness caused by the mixture of the both ink compositions was generated in the range of 70% to 120% duty of the secondary color with respect to the obtained recorded matters.

Evaluation criteria were as follows.
A: Recognizable aggregation unevenness was not generated in all duty area
B: Recognizable aggregation unevenness was generated in a portion of duty area
C: Recognizable aggregation unevenness was generated in most of duty area 3.4. Evaluation Result Evaluation results were presented in Table 3.

TABLE 3

| | | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 | Comparative Example 4 | Comparative Example 5 |
|---|---|---|---|---|---|---|---|---|---|---|---|---|---|---|---|---|
| | Ink | Ink 1 | Ink 2 | Ink 3 | Ink 6 | Ink 2 | Ink 1 | Ink 1 | Ink 1 | Ink 1 | Ink 1 | Ink 4 | Ink 5 | Ink 7 | Ink 1 | Ink 1 |
| | Mode | Mode 3 | Mode 3 | Mode 3 | Mode 3 | Mode 5 | Mode 1 | Mode 2 | Mode 4 | Mode 6 | Mode 7 | Mode 3 | Mode 3 | Mode 3 | Mode 8 | Mode 9 |
| | (C) [ms] | 21.89 | 21.89 | 21.89 | 21.89 | 21.89 | 10.94 | 16.42 | 32.83 | 200 | 1000 | 21.89 | 21.89 | 21.89 | 5 | 2500 |
| Evaluation test | Printing speed | A | A | A | A | A | A | B | B | A | B | A | A | A | A | C |
| | Ejection stability | A | A | B | A | A | B | B | A | A | A | C | A | C | A | A |
| | Presence/absence of aggregation unevenness | A | B | A | B | A | B | B | A | A | A | A | C | A | C | A |

As presented in Table 3, it was found that according to the ink and the print modes used in the examples, the printing speeds and the ejection stability were excellent, and thus the generation of the aggregation unevenness was able to be suppressed.

Meanwhile, in Comparative Examples 1 and 3, since Ink 4 and 7 of which respective initial viscosities (viscosities when volatile components were not volatilized) were greater than 15 mPa·s was used, the ejection stability significantly decreased. In Comparative Example 2, since Ink 5 of which the viscosity when 50% of the volatile component was volatilized was less than 100 mPa·s was used, the aggregation unevenness significantly occurred. In Comparative Example 4, since Print Mode 8 in which a time after the first ink composition was ejected to the predetermined area and before the second ink composition was ejected to the predetermined area was less than 10 ms was used, aggregation unevenness significantly occurred. In Comparative Example 5, since Print Mode 9 in which a time after the first ink composition was ejected to the predetermined area and before the second ink composition was ejected to the predetermined area was greater than 2000 ms was used, a printing speed significantly decreased.

The invention is not limited to the embodiment as described above, but various modifications are possible. For example, the invention includes configuration which is substantially the same as that described in the embodiment (for example, configuration that has the same function, method, and result, or configuration that has the same purpose and advantage). In addition, the invention includes configuration in which an unessential portion in the configuration described in the embodiment is replaced. Also, the invention includes a configuration that achieves the same effect as the configuration described in the embodiment or a configuration that can achieve the same purpose. In addition, the invention includes the configuration described in the embodiment to which the well-known technique is added.

The entire disclosure of Japanese Patent Application No.: 2014-099326, filed May 13, 2014 is expressly incorporated by reference herein.

What is claimed is:

1. An ink jet recording method of recording an image by using at least a first ink composition containing water, a surfactant, and a first coloring material and a second ink composition containing a second coloring material different from the first coloring material on a recording medium, the method comprising:
    recording an image on the recording medium by causing a first recording head that ejects the first ink composition and a second recording head that ejects the second ink composition to eject the first ink composition and the second ink composition while relative positions thereof with respect to the recording medium are changed,
    wherein, in the recording of the image, a time after the first ink composition is ejected to a predetermined area of the recording medium and before the second ink composition is ejected to the predetermined area is in the range of 10 ms to 2,000 ms,
    wherein a viscosity of the ink composition at 20° C. when the first ink composition is ejected is 15 mPa·s or less, and
    wherein the viscosity at 20° C. when 50% of a volatile component contained in the first ink composition is volatilized is 100 mPa·s or greater.

2. The ink jet recording method according to claim 1, wherein, when the second ink composition is ejected to the predetermined area, a volatile component contained in the first ink composition attached to the predetermined area is volatilized by 50% or more of the volatile component originally contained in the first ink composition.

3. The ink jet recording method according to claim 1, wherein a content of the surfactant contained in the first ink composition is 0.5% by mass or greater with respect to a total mass of the first ink composition.

4. The ink jet recording method according to claim 1, wherein the first ink composition contains at least one of a resin emulsion and a polymerizable compound, and
wherein a content of the resin emulsion and the polymerizable compound when converted into a solid content is in a range of 2% by mass to 25% by mass with respect to a total mass of the first ink composition.

5. The ink jet recording method according to claim 1, wherein a content of a non-volatile component contained in the first ink composition is in a range of 3% by mass to 40% by mass with respect to a total mass of the first ink composition.

6. The ink jet recording method according to claim 1, wherein a content of water contained in the first ink composition is 50% by mass or greater with respect to a total mass of the first ink composition.

7. The ink jet recording method according to claim 1, wherein the first ink composition is an ultraviolet light curing ink composition containing a polymerizable compound, and
wherein the ink jet recording method includes irradiating the first ink composition with ultraviolet light in order to cure the first ink composition.

8. The ink jet recording method according to claim 1, wherein the recording of the image is performed by performing the irradiation a plurality of times.

9. The ink jet recording method according to claim 1, wherein the recording of the image is performed by performing the irradiation one time.

10. The ink jet recording method according to claim 1, wherein the recording of the image includes heating of the recording medium between the ejection of the first ink composition and the ejection of the second ink composition.

11. The ink jet recording method according to claim 1, wherein the first recording head includes a first nozzle group block and a second nozzle group block, and
wherein the first nozzle group block and the second nozzle group block are different from each other in position in a scanning direction and different from each other in position in a direction intersecting to the scanning direction.

* * * * *